United States Patent [19]

Lewis et al.

[11] Patent Number: 4,489,320

[45] Date of Patent: Dec. 18, 1984

[54] INTERFERENCE SUPPRESSOR FOR RADAR MTI

[75] Inventors: Bernard L. Lewis, Oxon Hill; Frank F. Kretschmer, Laurel, both of Md.

[73] Assignee: The United States of America as represented by the Secretary of the Navy, Washington, D.C.

[21] Appl. No.: 290,757

[22] Filed: Aug. 7, 1981

[51] Int. Cl.³ .......................... G01S 9/02; G01S 9/42
[52] U.S. Cl. ..................................... 343/7.7; 343/7 A
[58] Field of Search ................ 343/7 A, 7 AG, 7 PL, 343/7.7, 7

[56] References Cited

U.S. PATENT DOCUMENTS

| | | | |
|---|---|---|---|
| 3,066,288 | 11/1962 | Vogtmann | 343/7.7 |
| 3,109,171 | 5/1963 | Henry et al. | 343/7.7 |
| 3,222,602 | 12/1965 | Gager et al. | 455/304 |
| 3,495,242 | 2/1970 | Dickey, Jr. | 343/7.7 |
| 3,706,993 | 12/1972 | Kuck | 343/7.7 X |
| 3,733,605 | 5/1973 | Osterman | 343/7.7 |
| 3,775,770 | 11/1973 | Dillard et al. | 343/7.7 X |
| 3,860,924 | 1/1975 | Evans | 343/7.7 |
| 3,968,490 | 7/1976 | Gootin | 343/7.7 |
| 3,971,997 | 7/1976 | Lewis et al. | 343/7.7 X |
| 3,991,417 | 11/1976 | Arnold | 343/7.7 |
| 4,217,584 | 8/1980 | Lombardi et al. | 343/7.7 |
| 4,318,099 | 3/1982 | Hsiao | 343/7.7 X |
| 4,375,640 | 3/1983 | Harvey | 343/7.7 |
| 4,385,298 | 5/1983 | Josefsson et al. | 343/7.7 |

Primary Examiner—Maynard R. Wilbur
Assistant Examiner—Brian Steinberger
Attorney, Agent, or Firm—Robert F. Beers; William T. Ellis

[57] ABSTRACT

An impulse interference suppression circuit for use in combination with an N-pulse Moving Target Indicator system comprising a gate connected to block the output signal from the MTI system when energized, and a circuit for taking the magnitudes of successive echo return signals, subtracting the magnitudes of consecutive echo signals to remove clutter, comparing the consecutive difference signals from such subtractions against each other, and generating and applying a blocking signal to the gate if the difference between the subtraction difference signals is above a given threshold level.

4 Claims, 1 Drawing Figure

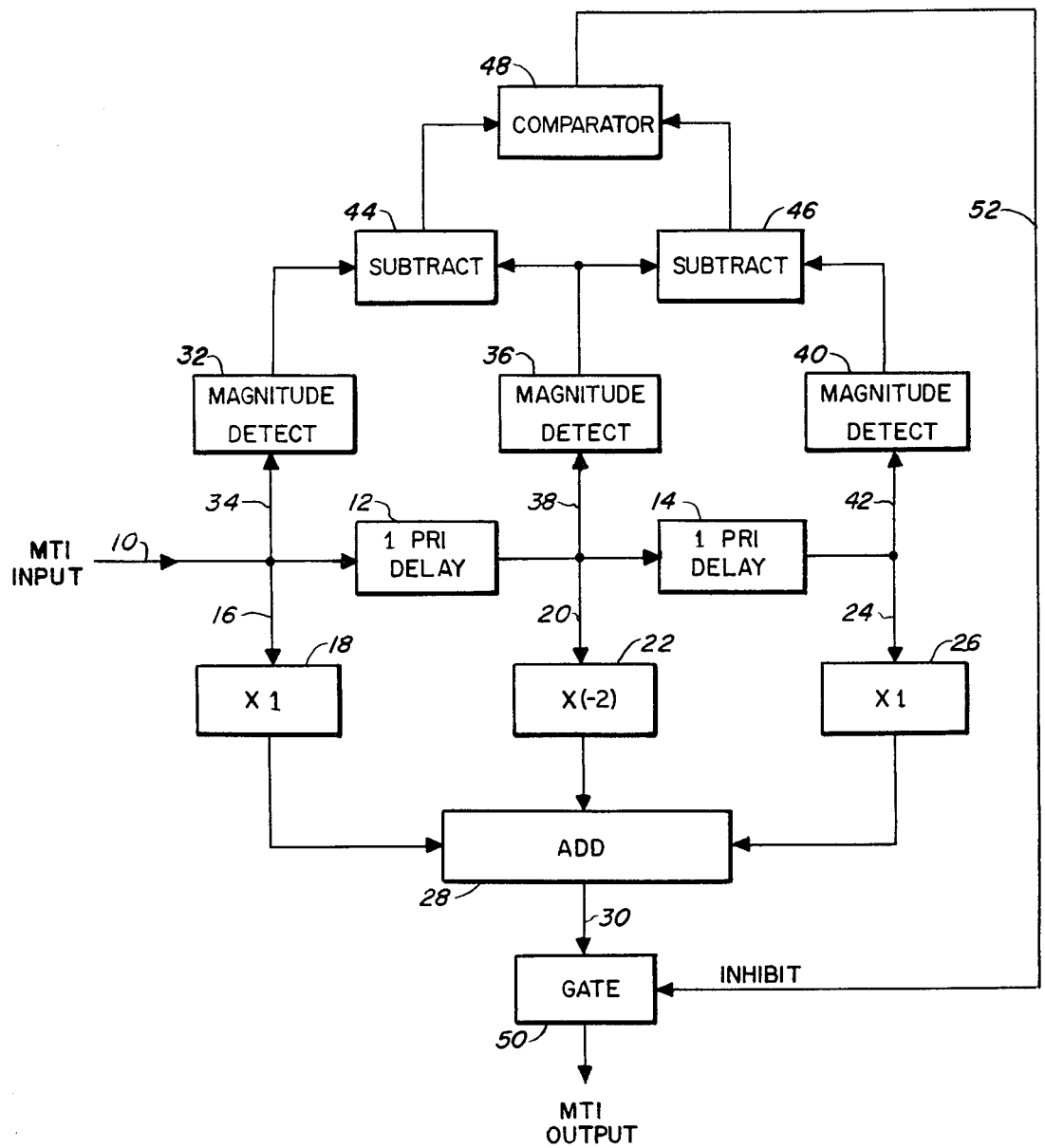

INTERFERENCE SUPPRESSOR FOR RADAR MTI

FIELD OF THE INVENTION

The present invention relates generally to Moving Target Indicator systems, and more particularly, to circuits for removing low duty cycle (impulsive) interference from MTI system outputs.

BACKGROUND OF THE INVENTION

Low duty cycle or impulsive interference is generally defined as interference lasting for a short time relative to the pulse repetition interval (PRF). The PRF is normally on the order of 300 pulses/second. Such low duty cycle or impulsive interference may be caused by a variety of electrical discharges such as, for example, discharges in electrical equipment, and lightning. Such discharges can have a period as short as 0.1 m seconds.

Typical prior art systems for suppressing impulsive interference in MTI signal outputs required the detection of coincidence in two consecutive MTI signal outputs in order to indicate a valid target and not impulsive interference. The non-coincidence of consecutive MTI outputs was assumed to indicate impulsive interference which would then be typically blocked by AND gates. This form of interference suppression with an N pulse MTI system required that the radar remain on the same frequency and the same azimuth angle for at least 2N pulses (N pulses are required for each MTI signal output.) Clearly this 2N pulse requirement decreased the radar data rate capability. Additionally, the requirement for the radar to remain at the same frequency over the 2N pulses significantly limited the radar's ability to employ frequency diversity. As is well known in the art, it is desirable to constantly switch the radar pulse transmission frequency in order to prevent enemy jammers from measuring the pulse frequency and spot-jamming the radar signal.

OBJECTS OF THE INVENTION

It is an object of the present invention to suppress impulsive or low duty cycle interference in the output of an MTI system and thereby prevent such interference from entering the radar's signal processing and/or display system, without suppressing echos from valid targets.

It is a further object of the present invention to detect low duty cycle interference in a single N pulse set and to utilize this detection to block the progression of the interference through the system.

It is yet a further object of the present invention to detect low duty cycle interference in a fraction of the time required by prior art methods thereby allowing the radar data rate to be increased.

It is a further object of the present invention to expand the frequency diversity ability of N pulse MTI radar systems.

Other objects, advantages, and novel features of the present invention will become apparent from the detailed description of the invention, which follows the summary.

SUMMARY OF THE INVENTION

Briefly, the above and other objects are realized by providing in combination with an N-pulse Moving Target Indicator system a gate connected to block when energized the output signal from the MTI system, and a circuit for subtracting consecutive echo signals in an N-pulse series to remove clutter, and generating and applying a blocking signal to the gate if one of the resulting differences from these subtractions exceeds a threshold level.

In a further embodiment of the present invention, consecutive difference signals may be compared against each other and a blocking signal generated if the difference there between exceeds a given threshold level.

BRIEF DESCRIPTION OF THE DRAWING

The FIGURE shows in block diagram form one embodiment of the present invention.

DETAILED DESCRIPTION OF THE PREFERRED EMBODIMENT

Referring now to the drawing, wherein like reference characters designate like or corresponding parts throughout the views, the FIGURE shows one embodiment of the present invention in block diagram form. The invention is disclosed in the context of a conventional $N=3$ pulse MTI system with binomial weighting for convenience. However, it should be understood that there is clearly no intent to limit the present invention to 3 pulse systems.

Referring to the 3 pulse MTI system shown in the FIGURE, this system employs two PRI (pulse repetition interval) delays 12 and 14 in order to obtain three successive echos from targets. A typical binomial weighting sequence for a 3 pulse system would require the multiplication of the first and the last echo pulses by the number 1 and the multiplication of the second echo pulse by the number $-2$. These three weighted signals are then added to obtain an MTI output signal with stationary target clutter removed therefrom. In the FIGURE, the foregoing is implemented by applying an MTI input on line 10 to a first multiply by 1 circuit 18 via the line 16, to a multiply by $-2$ circuit 22 via the PRI delay circuit 12 and the line 20, and to a second multiply by 1 circuit 26 via a second PRI delay circuit 14 and the line 24. The output signals from the multipliers 18, 22, and 26 are added together in the adder 28 to obtain an output signal on the line 30.

In operation, echos from non-moving targets will be approximately identical on each successive pulse. Thus, the multiplication and adding process of the above described circuit effectively cancels the clutter echos from non-moving targets. However, echos from radially moving targets have nearly the same amplitude but different phases on successive pulses due to the targets motion during the interpulse period. Thus, such radially moving targets do not cancel because of the phase difference from pulse to pulse.

Impulsive interference, because it is typically short with respect to the pulse repetition interval (PRI) will only be on one echo tap line at a time. Since this impulsive interference will not be in the other two echo tap lines, it will not be canceled in the binomial weighting process. Accordingly, impulsive interference will be present in the signal on line 30. As noted above, the prior art systems determine the existence of impulsive interference in the signal by comparing two consecutive N pulse sets with the attendant disadvantages of decreased data rate and frequency diversity.

The present suppression circuit design to be discussed will make it possible to determine the existence of impulsive interference and thus block the MTI signal output on line 30 in a single N pulse set. In essence, this circuit is designed to operate to detect the magnitude of successive echo return signals within an N pulse set, subtract the magnitudes of consecutive echo signals to remove clutter, compare the difference signals obtained from this subtraction step against a threshold level or against another consecutive different signal, and to block the output signal from the MTI system on line 30 if one of these difference signals exceeds the threshold level. This system is implemented in the 3 pulse MTI circuit of the FIGURE by first detecting the magnitude of the signal on the MTI input line 10, the magnitude of the signal at the output of the PRI delay circuit 12, and the magnitude of the signal at the output of the PRI delay circuit 14. In this regard, the MTI input signal on line 10 is applied via line 34 to the magnitude detector 32. Likewise, the output signal from the delay circuit 12 is applied via the line 38 to the magnitude detector 36, and the output signal from the delay circuit 14 is applied via the line 42 to the magnitude detector 40. In one embodiment, these magnitude detectors may simply operate to square and then sum the I and Q quadrature signals for each of the incoming echo returns.

The magnitudes of consecutive echo signals from the magnitude detectors 32, 36, and 40 are then subtracted from each other in order to remove the stationary target clutter. More specifically, the magnitude output from the magnitude detector 32 is applied to one input of a subtractor 44 while the magnitude of the magnitude detector 36 is applied to a second input of that subtractor. Likewise, the magnitude output from the magnitude detector 36 is applied to a first input of a subtractor 46, while the magnitude output from the magnitude detector 40, is applied to a second input of the subtractor 46. Since the clutter signal and the target signal in a given echo return pulse will change only minimally from pulse to pulse, the difference ouputs from the subtractors 44 and 46 should be very small unless there is impulsive interference in one of the echo pulse returns. As noted earlier, this impulsive interference is of very short duration and will normally only be present in a single echo return signal. Thus, subtraction operations from pulse to pulse will not act to cancel this interference from the signal. Accordingly, if the amplitude from either of these subtractors 44 or 46 is above a given threshold level, then impulsive interference is assumed to be present in the MTI signal and the signal on line 30 is required to be be blocked. Accordingly, each of the outputs from the subtractors 44 and 46 may be applied to a threshold circuit in order to compare their amplitudes to a given threshold level. If this threshold level is exceeded, then these threshold circuits would generate a signal to inhibit gate 50 in the MTI output line 30. If is understood, of course, that this threshold operation is to be performed on magnitudes. Thus, in a digital system the sign bit must be made positive at this point, while in an analog system a magnitude detector may be added.

Although the use of two threshold detectors to determine the presence of impulsive interference will facilitate a viable suppression systems, problems arise in attempting to set the proper threshold level in each threshold detector. Such threshold setting problems may obviated by merely comparing the outputs from the subtractors 44 and 46 against each other in a comparator 48. Again, this operation must be performed on signal magnitudes. Typically, an antenna scan will only make an amplitude change of 0.1 dB from pulse to pulse. Thus, a signal threshold could be arbitrarily set at, by way of example, 3 dB in the comparator 48. If the difference outputs from the subtractors 44 and 46 differ by more than 3 dB, then impulsive interference is assumed to be present and an inhibit signal will be generated and applied via the line 52 to inhibit the gate 50 thereby blocking the MTI output signal. By way of example, this comparator 48 may be implemented simply by an OR gate.

The present invention differs from the prior art in that it utilizes interference sensing rather than target sensing in order to detect impulsive interference. Since interference is expected to occupy a given group of range resolution cells on one pulse repetition interval and to be absent on successive pulse repetition intervals, such interference can be detected and blocked by the present system in the time necessary to form one MIT pulse. Thus, the time required for the suppression operation is simply the time required to charge an N pulse MTI with N pulses i.e., N pulse repetition intervals (PRI). Accordingly, the present invention can make its decision as to the presence or absence of impulsive interference in half the time required by prior art methods. This significant reduction in the decision time on whether an MTI signal output is a valid moving target or merely impulsive interference permits the radar data rate to be doubled and also enhances the radar's ability to employ frequency diversity techniques.

It should be understood that the present invention can be used with any processor similar to an MTI system provided that successive samples of desired signals are not expected to vary in amplitude by as much as undesired impulsive signals.

It should also be noted that although the present invention was implemented utilizing magnitude detectors, it is possible to simply take the largest of the I or Q signals for each set of N pulses and process these signals in an identical manner. Although the use of only the I or Q component will not provide optimum results, such as configuration will allow for an operable system with a respectable accuracy.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An N-pulse Moving Target Indicator impulse interference suppression system comprising:
   an MTI input,
   N−1 delay circuits arranged to successively delay the MTI input signal by N−1 PRI in order to obtain a series of consecutive pulse echo signals, N being an integer greater than one;
   a gate circuit;
   means for combining with appropriate weighting the echo signal from said MTI input and the echo signal from each of said N−1 delay circuits and providing a resultant signal to said gate circuit with clutter signals canceled therefrom;
   means for comparing said MTI input echo signal and the echo signals from each of said N−1 delay circuit outputs comprising means for detecting the magnitude of said MTI input echo signal and of the echo signals from each of said N−1 delay circuit outputs, means for subtracting the magnitudes of consecutive echo signals, to obtain difference signals, and a comparator for comparing consecutive resulting difference signals obtained from said subtracting means against each other and if the difference therebetween is above a given threshold level, generating a blocking signal and applying it to said gate circuit.

2. A system as defined in claim 1, wherein N is 3 such that there are a first and a second delay circuits and wherein said subtracting means further comprises:
   a first subtractor circuit for subtracting the magnitude of said MTI input echo signal from the magnitude of the output echo signal from said first delay circuit;
   a second subtractor circuit for subtracting the magnitude of the output echo signal from said first delay circuit from the magnitude of the output echo signal from said second delay circuit;
   wherein said comparator compares the magnitudes of the outputs from said first and second subtractor circuits and generates a blocking signal if the difference between said compared signals is above said predetermined threshold.

3. An improved N-pulse Moving Target Indicator system including N−1 consecutive PRI delay circuits and means for appropriately combining the delay signals to obtain an output signal free of stationary target echo clutter, the improvement comprising:
   a blocking gate connected to block the output signal from said MTI system when energized;
   means for subtracting consecutive echo signals from each other to obtain difference signals; and
   means for comparing consecutive resulting difference signals from said subtracting means against each other and generating and applying a blocking signal to said blocking gate if the difference between said difference signals is above a given threshold level.

4. A method for suppressing impulse interference in an N-pulse Moving Target Indicator system comprising the steps of:
   detecting the magnitude of successive echo return signals in an N-pulse set, where $N \geq 3$;
   subtracting the magnitudes of consecutive echo signals from each other and generating a difference signal;
   comparing consecutive difference signals from said subtracting step against each other; and
   blocking the MTI system output if the difference between consecutive difference signals exceeds a given threshold level.

* * * * *